3,327,025
O,O-DIMETHYLDITHIOPHOSPHORIC ESTERS
Jean Metivier, Choisy-le-Roi, and Michel Sauli, Paris, France, assignors to Rhone-Poulenc S.A., Paris, France, a corporation of France
No Drawing. Filed Apr. 22, 1963, Ser. No. 274,827
Claims priority, application France, Apr. 25, 1962, 895,544; Feb. 19, 1963, 925,287
6 Claims. (Cl. 260—948)

This invention relates to new dithiophosphoric esters, to processes for their preparation, and to parasiticidal compositions containing them.

According to the present invention, there are provided the hitherto unknown dithiophosphoric esters of the general formula:

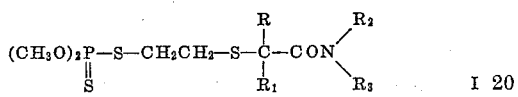
    I wherein R and $R_1$ are the same or different and each represents an alkyl group containing up to 4 carbon atoms, and $R_2$ and $R_3$ are the same or different and each represents a hydrogen atom or an alkyl or alkenyl group containing up to 4 carbon atoms, or $R_2$ and $R_3$ together with the nitrogen atom to which they are attached collectively represent a 5- or 6-membered, mononuclear heterocyclic group, which may contain a second hetero atom, e.g. nitrogen or oxygen, in particular a 1-pyrrolidinyl, piperidino, 1-piperazinyl or morpholino group. Preferred compounds are those in which $R_2$ represents a hydrogen atom, for example, N-methyl 5-O,O-dimethyldithiophosphoryl-3-thia-2,2-dimethylvaleramide and the corresponding N-ethyl, N-isopropyl and N-allyl compounds.

According to a feature of the invention, the dithiophosphoric esters of Formula I are prepared by the process which comprises reacting a halogenothiophosphate of the formula:

    II wherein Hal represents a halogen (preferably chlorine) atom, with a compound of the formula:

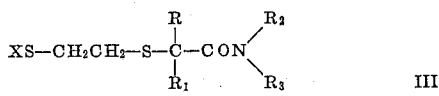
    III wherein X represents a hydrogen or alkali metal atom. The reaction is preferably carried out in an inert organic solvent medium at a temperature below 150° C., and when X represents hydrogen in the presence of a basic condensing agent. Preferred solvents are aliphatic alcohols (for example methanol or ethanol), aliphatic ketones (for example acetone or methyl ethyl ketone) or chlorinated hydrocarbons (for example, chloroform); preferred condensing agents are the alkali metals or derivatives thereof (for example hydroxides or carbonates).

According to a further feature of the invention, the dithiophosphoric esters of Formula I are prepared by the process which comprises reacting an alkali metal (preferably sodium or potassium) or ammonium salt of the dithiophosphoric compound of the formula:

    IV with a reactive ester of the formula:

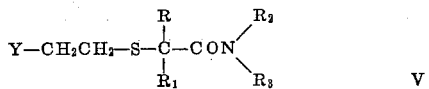
    V wherein Y represents the acid residue of a reactive ester such as a halogen (preferably chlorine) atom or a sulphuric or sulphonic ester residue (for example toluene-p-sulphonyloxy), and the other symbols are as hereinbefore defined. The reaction is preferably carried out in an inert organic solvent medium, for example an aliphatic alcohol or ketone, advantageously at the boiling point of the solvent employed. The reaction may also be effected in water, preferably with gentle heating to maintain the temperature of the reaction mixture at about 30–40° C.

According to another feature of the invention, the dithiophosphoric esters of Formula I are prepared by the process which comprises reacting a compound of the formula:

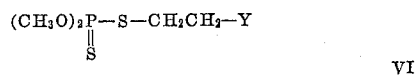
    VI wherein Y is as hereinbefore defined, with an amide of the formula:

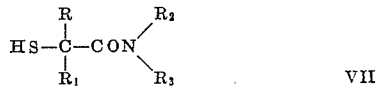
    VII wherein the various symbols are as hereinbefore defined. The reaction is preferably carried out under the same conditions as those described above in relation to the last-mentioned process.

The dithiophosphoric esters of general Formula I possess parasiticidal properties associated with a very low toxicity towards warm-blood animals. They therefore find particular application as systemic parasiticides in the treatment of animals infected with arthopods, which live on or in the bodies of these animals: in particular there may be mentioned as such parasites *Hypodermia bovis*, which attacks livestock and produces a wasting of the animals and a fall in milk production, *Dermatobia gastrophilus*, *Dermatobia hominis*, *Oestrus ovis*, which attack sheep, and also flies and lice which infest domestic animals and are carriers of numerous dangerous infections. The compounds of the present invention are capable of destroying all these parasites and are particularly effective since, on the one hand, they are very active against all the developmental stages of the parasites and, on the other, they are active at dosages which are atoxic to the treated animals. They are administered orally, parenterally or locally according to the nature of the parasite to be destroyed and the animal to be treated, generally in the form of compositions wherein the compounds of Formula I are associated with solid or liquid diluents, or excipients.

Parasiticidal compositions for oral administration may take the form of solutions, suspensions or emulsions in aqueous, organic or aqueous-organic media. These compositions may be administered to the animals by forced feeding or in capsules. They may also take the form of powders or solid concentrates containing, in addition to the active compound, powdered or solid diluents, which are added to the animals' feedstuffs.

Parasiticidal compositions for per-cutaneous administration may be in the form of solutions, suspensions or emulsions to which are added one or more wetting agents. These compositions, if necessary after dilution, are vapourised, poured or syrayed onto the skins of the animals to be treated, or the animals dipped in them.

The compounds of Formula I are employed at dosages which depend upon the animal to be treated, the parasite to be destroyed and the route of administration. A dosage rate between 20 and 50 mg./kg. is generally used for oral administration and between 25 and 100 mg./kg. for per-cutaneous treatment. A single application of active material is generally sufficient but in certain cases it may be advantageous to repeat the treatment a week after the first administration. In the case of administration in the form of powder, it may be preferable to administer lower dosages over a longer period.

The following examples illustrate the invention.

*Example I*

N-methyl 5-chloro-3-thia-2,2-dimethylvaleramide (23.5 g.) is added to a solution of ammonium dimethyldithiophosphate (22.8 g.) in water (175 cc.) and the temperature of the mixture kept at about 30–35° C. for 8 hours by gentle heating. After standing overnight at ambient temperature, the oil formed is separated by decanting and dissolved in methylene chloride (100 cc.). The solution obtained is washed with a 10% aqueous sodium bicarbonate solution (50 cc.) followed by water (50 cc.), dried over sodium sulphate and then treated with decolourising charcoal. After removal of the solvent under reduced pressure, a yellow oil remains (35.5 g.). Analysis shows this to be N-methyl 5-O,O-dimethyldithiophosphoryl-3-thia-2,2-dimethylvaleramide.

The N-methyl 5-chloro-3-thia-2,2-dimethylvaleramide (M.P. 68° C.) starting material is prepared by reacting thionylchloride with N-methyl 5-hydroxy-3-thia-2,2-dimethylvaleramide (M.P. 32–33° C.), itself obtained by reacting monomethylamine with ethyl 5-hydroxy-3-thia-2,2-dimethylvalerate. The latter compound is a colourless liquid (B.P. 100–102° C./0.2 mm. Hg) prepared by reacting monothioglycol with ethyl 2-bromoisobutyrate.

*Example II*

N-ethyl 5-chloro-3-thia-2,2-dimethylvaleramide (27 g.) is added to a solution of ammonium dimethyldithiophosphate (24.7 g) in water (175 cc.) and the temperature of the mixture maintained at about 35–40° C. for 12 hours by gentle heating After returning the reaction mixture to ambient temperature, the oil formed is separated by decanting and dissolved in methylene chloride (200 cc.). The solution obtained is washed with a 10% aqueous sodium bicarbonate solution (50 cc.) followed by water (50 cc.), dried over sodium sulphate and then treated with decolourising charcoal. After removal of the solvent under reduced pressure, a yellow oil (39 g.) remains. Analysis shows this to be N-ethyl 5-O,O-dimethyldithiophosphoryl-3-thia-2,2-dimethylvaleramide.

The N - ethyl 5-chloro-3-thia-2,2-dimethylvaleramide (M.P. 44–45° C.) starting material is prepared by reacting thionyl chloride with N-ethyl 5-hydroxy-3-thia-2,2-dimethylvaleramide (B.P. 138–143° C./0.3 mm. Hg), itself obtained by reacting ethylamine with ethyl 5-hydroxy-3-thia-2,2-dimethylvalerate.

*Example III*

N - isopropyl 5 - chloro-3-thia-2,2-dimethylvaleramide (33.5 g.) is added to a solution of ammonium dimethyldithiophosphate (28.4 g.) in water (200 cc.) and the temperature of the mixture maintained at about 35–40° C. for 13 hours by gentle heating. After returning the reaction mixture to ambient temperature, the oil formed is separated by decanting and dissolved in methylene chloride (100 cc.). The solution obtained is washed with a 10% aqueous potassium bicarbonate solution (100 cc.) followed by water (100 cc.), dried over sodium sulphate and then treated with decolorising charcoal. After removal of the solvent under reduced pressure, a yellow oil (47 g.) remains. Analysis shows this to be N-isopropyl 5-O,O-dimethyldithiophosphoryl - 3 - thia-2-,2-dimethylvaleramide.

The N-isopropyl 5-chloro-3-thia-2,2-dimethylvaleramide (M.P. 71° C.) starting material is prepared by reacting thionyl chloride with N-isopropyl 5-hydroxy-3-thia-2,2-dimethylvaleramide (B.P. 132–133° C./0.2 mm. Hg), itself obtained by reacting isopropylamine with ethyl 5-hydroxy-3-thia-2,2-dimethylvalerate.

*Example IV*

N-allyl 5-chloro-3-thia-2,2-dimethylvaleramide (29 g.) is added to a solution of ammonium dimethyldithiophosphate (24.6 g.) in water (175 cc.) and the temperature of the mixture maintained at about 35–40° C. for 13 hours by gentle heating. After returning the reaction mixture to ambient temperature, the oil formed is separated by decanting and dissolved in methylene chloride (100 cc.). The solution obtained is washed with a 10% aqeous potassium bicarbonate solution (100 cc.) followed by water (100 cc.), dried over sodium sulphate and then treated with decolourising charcoal. After removal of the solvent under reduced pressure, a yellow oil (38.5 g.) remains. Analysis shows this to be N-allyl 5-O,O-dimethyldithiophosphoryl-3-thia-2,2-dimethylvaleramide.

The N-allyl 5 - chloro - 3 - thia-2,2-dimethylvaleramide (B.P. 122–123° C./0.3 mm. Hg) starting material is prepared by reaction of thionyl chloride with N-allyl 5-hydroxy - 3 - thia - 2,2-dimethylvaleramide (B.P. 136–140° C./0.1 mm. Hg), itself obtained by reacting allylamine with ethyl 5-hydroxy-3-thia-2,2-dimethylvalerate.

The following examples illustrate parasiticidal compositions according to the invention.

*Example V*

A 10% solution of N-methyl 5-O,O-dimethyldithiophosphoryl-3-thia-2,2-dimethylvaleramide in olive oil is prepared. This solution may be used for oral administration to destroy warble-fly in cattle.

*Example VI*

A solution is prepared containing N-methyl 5-O,O-dimethyldithiophosphoryl - 3 - thia-2,2-dimethylvaleramide (250 g.), a condensation product of octylphenol with ethylene oxide containing 10 molecules of ethylene oxide per molecule of octylphenol (50 g.), a condensation product of oleic acid and ethylene oxide (50 g.), and a 4:1 mixture of acetophenone and toluene (q.s.p. 1000 cc.). The solution obtained may be used, either as it is or after dilution with water, to protect cattle against warble-fly by per-cutaneous treatment.

We claim:
1. Phosphorus esters of the formula:

$$(CH_3O)_2\underset{\underset{S}{\|}}{P}-S-CH_2CH_2-S-\underset{\underset{R_1}{|}}{\overset{\overset{R}{|}}{C}}-CON\diagdown_{R_3}^{R_2}$$

wherein R and $R_1$ represent alkyl groups containing up to 4 carbon atoms, and $R_2$ and $R_3$ represent a member of the class consisting of a hydrogen atom and alkyl and alkenyl groups containing up to 4 carbon atoms.

2. Phosphorus esters of the formula:

$$(CH_3O)_2\underset{\underset{S}{\|}}{P}-S-CH_2CH_2-S-\underset{\underset{R_1}{|}}{\overset{\overset{R}{|}}{C}}-CONHR_3$$

wherein R and $R_1$ represent alkyl groups containing up to 4 carbon atoms, and $R_3$ represents a member of the class consisting of a hydrogen atom, and alkyl and alkenyl groups containing up to 4 carbon atoms.

3. N-methyl 5 - O,O-dimethyldithiophosphoryl-3-thia-2,2-dimethylvaleramide.

4. N-ethyl 5-O,O-dimethyldithiophosphoryl-3-thia-2,2-dimethylvaleramide.

5. N - isopropyl 5 - O,O - dimethyldithiophosphoryl-3-thia-2,2-dimethylvaleramide.

6. N-allyl 5 - O,O - dimethyldithiophosphoryl - 3-thia-2,2-dimethylvaleramide.

References Cited

UNITED STATES PATENTS

| | | | |
|---|---|---|---|
| 2,494,283 | 1/1950 | Cassaday et al. | 260—461 |
| 2,943,974 | 7/1960 | Metivier | 260—948 |
| 2,954,317 | 9/1960 | Kenega | 167—22 |
| 2,970,080 | 1/1961 | Oros et al. | 167—22 |
| 2,981,748 | 4/1961 | Metivier | 260—461 |

CHARLES B. PARKER, *Primary Examiner.*

F. M. SIKORA, B. BILLIAN, *Assistant Examiners.*